(12) United States Patent
Seeley et al.

(10) Patent No.: US 7,822,803 B2
(45) Date of Patent: Oct. 26, 2010

(54) TESTING USING ASYNCHRONOUS AUTOMATED VIRTUAL AGENT BEHAVIOR

(75) Inventors: Albert Seeley, Burlington, MA (US); Richard C. Kuzsma, Jr., Nashua, NH (US); Lei Shen, Sudbury, MA (US); Kevin Sturgeon, Hermosa Beach, CA (US)

(73) Assignee: Empirix Inc., Bedford, MA (US)

( * ) Notice: Subject to any disclaimer, the term of this patent is extended or adjusted under 35 U.S.C. 154(b) by 1086 days.

(21) Appl. No.: 11/157,015

(22) Filed: Jun. 20, 2005

(65) Prior Publication Data

US 2006/0167970 A1 Jul. 27, 2006

Related U.S. Application Data

(60) Provisional application No. 60/627,493, filed on Nov. 12, 2004.

(51) Int. Cl.
*G06F 15/16* (2006.01)
(52) U.S. Cl. .............. 709/202; 709/204; 379/88.16; 379/265.09; 455/90.2; 370/352; 370/353
(58) Field of Classification Search .......... 709/202, 709/204; 379/88.16, 265.09; 455/90.2; 370/352, 370/353
See application file for complete search history.

(56) References Cited

U.S. PATENT DOCUMENTS 5,561,707 A * 10/1996 Katz .................. 379/88.16
5,917,903 A * 6/1999 Jolissaint ............... 379/265.02
6,707,811 B2 * 3/2004 Greenberg et al. .......... 370/352
6,763,226 B1 * 7/2004 McZeal, Jr. ................ 455/90.2
6,791,974 B1 * 9/2004 Greenberg ................ 370/352
6,831,966 B1 * 12/2004 Tegan et al. .............. 379/88.16
6,944,799 B1 * 9/2005 Seeley et al. ................ 714/47
7,016,475 B2 3/2006 Resuta
7,382,773 B2 * 6/2008 Schoeneberger et al. .... 370/353
7,706,521 B2 * 4/2010 Gavagni et al. ......... 379/265.09
2003/0035532 A1 * 2/2003 Ganesan et al. ......... 379/265.04
2003/0115266 A1 6/2003 Sweet et al.
2004/0008825 A1 1/2004 Seeley et al.
2006/0167970 A1 * 7/2006 Seeley et al. .............. 709/202

* cited by examiner

*Primary Examiner*—Thu Ha T Nguyen
(74) *Attorney, Agent, or Firm*—SilverSky Group, LLC

(57) ABSTRACT

A method and computer program product for testing using asynchronous automated virtual agent behavior is presented. A communication including one of a web-based communication and a telephony-based communication is received at a contact center. The communication is responded to by a virtual agent simulating actions of an agent in a coordinated, asynchronous manner. The virtual agent is capable of providing a response to the web-based communication and to the telephony-based communication. At least one parameter of said contact center is measured and the results are presented to a contact center manager.

24 Claims, 4 Drawing Sheets

TESTING USING ASYNCHRONOUS AUTOMATED VIRTUAL AGENT BEHAVIOR

CROSS REFERENCE TO RELATED APPLICATIONS

The present application claims the benefit of U.S. Provisional Patent Application No. 60/627,493, filed on Nov. 12, 2004; which is incorporated herein by reference in its entirety.

BACKGROUND

Contact centers are systems in which a person can communicate to receive information. Such communication can include, but is not limited to, telephone calls, Internet access, email, and FAX. A contact center can include one or more interactive voice response (IVR) systems. The one or more IVRs provide automatic branching voice queries to which the caller responds with button pushes on a telephone keypad or with voice responses on a telephone. The contact center may be provided having only the one or more IVR systems, or alternatively, it is also provided having human agents. For example, at the end of the IVR branching voice queries, the caller can be directed to press zero to speak to an agent. The agent is a person having a telephone to talk to the caller, hereafter referred to as an "agent telephone," and a computer to access information about the caller, hereafter referred to as an "agent computer." Note that though the agent telephone and the agent computer are often associated with one person, they correspond to distinct electronic systems and will be separately referred to herein.

The contact center can also include one or more database server computers, one or more database storage areas, one or more web server computers, and one or more email server computers. As described above, contact center actions include actions generated by agents within the contact center as well as actions by people outside of the contact center, for example telephone callers and web users.

Contact center functions include data transfers that occur within the contact center, and such data can be internal to the contact center or can be provided to agents, telephone callers and web users. Contact center functions include, but are not limited to, accesses to and responses from the IVR, Computer Telephone Integration (CTI) transactions, screen pops, accesses to the application server, accesses to the database server, accesses to the web server, and accesses to the email server. A screen pop (screen population) is typically rendered by a contact center agent application. A screen pop is rendered in response to the receipt of call variables from a CTI server. The application may directly display the call variables or use the call variables to perform a look-up of customer data in a database and render the customer data. CTI refers to systems that enable a computer to act as a call center, accepting incoming calls and routing them to the appropriate device or person. CTI systems can handle all sorts of incoming and outgoing communications, including phone calls, faxes, and Internet messages. Screen pops are provided to an agent to correlate identifying information with caller data.

Various types of test data are of interest to contact center designers and managers. In particular, a variety of delay time periods or latencies are of interest. For example, contact center designers are interested in the time latency between a variety of the telephony caller actions, the agent telephony actions, the agent computer actions, the web user actions, and the contact center functions. The telephony caller action can, for example, correspond to an IVR selection, using the telephone keypad, as a request for connection to an agent generated by the telephone caller system. The contact center function can, for example, correspond to a screen pop upon the agent computer associated with the agent computer system. The time latency of interest can, for example, correspond to the time period between the request for connection to an agent and the screen pop.

SUMMARY

While contact centers have proven extremely popular, the ability to test various functions by conventional means has proven difficult. In particular, the ability to test web-based contact center communications and functions, telephony-based contact center communications and functions and the combination of concurrent web-based contact center communications and functions along with telephony-based contact center communications and functions in order to fully verify and quantify operation of a contact center has proven to be a great challenge.

Conventional mechanisms such as those explained above suffer from a variety of deficiencies. One such deficiency is coordinating activity between various pieces of the contact center in order to provide a test from which accurate and meaningful time latencies can be determined in order to verify functionality and quantify performance of the contact center.

Embodiments of the invention significantly overcome such deficiencies and provide mechanisms and techniques that provide testing using asynchronous and coordinated automated virtual agents.

In a particular embodiment of a method for providing testing using asynchronous automated virtual agent behavior, the method includes receiving a communication at a contact center, the communication including one of a web-based communication and a telephony-based communication. A virtual agent responds to the communication by simulating actions of an agent. The virtual agent is able to emulate multiple forms of interactions simultaneously. This includes, but is not limited to, communications such as telephony, fax, Voice Over Internet Protocol (VOIP), e-mail, chat and various Web communications. The virtual agent is capable of providing a response to both the web-based communication and the telephony-based communication. At least one parameter of the contact center is measured and the results of the measuring of the at least one parameter of the contact center are made available.

Other embodiments include a computer readable medium having computer readable code thereon for providing a method of testing using asynchronous automated virtual agent behavior, the medium includes instructions for receiving a communication at a contact center, the communication including one of a web-based communication and a telephony-based communication. The medium further includes instructions for responding to the communication with a virtual agent simulating actions of an agent, the virtual agent capable of providing a response to the web-based communication and to the telephony-based communication. The medium also includes instructions for measuring at least one parameter of the contact center, and instructions for providing results of the measuring of the at least one parameter of the contact center.

Still other embodiments include a computerized device, configured to process all the method operations disclosed herein as embodiments of the invention. In such embodiments, the computerized device includes a memory system, a processor, communications interface in an interconnection mechanism connecting these components. The memory system is encoded with a process that provides a method of testing using asynchronous automated virtual agent behavior as explained herein that when performed (e.g. when executing) on the processor, operates as explained herein within the computerized device to perform all of the method embodiments and operations explained herein as embodiments of the invention. Thus any computerized device that performs or is programmed to perform up processing explained herein is an embodiment of the invention.

Other arrangements of embodiments of the invention that are disclosed herein include software programs to perform the method embodiment steps and operations summarized above and disclosed in detail below. More particularly, a computer program product is one embodiment that has a computer-readable medium including computer program logic encoded thereon that when performed in a computerized device provides associated operations providing a method of testing using asynchronous automated virtual agent behavior as explained herein. The computer program logic, when executed on at least one processor with a computing system, causes the processor to perform the operations (e.g., the methods) indicated herein as embodiments of the invention. Such arrangements of the invention are typically provided as software, code and/or other data structures arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC) or as downloadable software images in one or more modules, shared libraries, etc. The software or firmware or other such configurations can be installed onto a computerized device to cause one or more processors in the computerized device to perform the techniques explained herein as embodiments of the invention. Software processes that operate in a collection of computerized devices, such as in a group of data communications devices or other entities can also provide the system of the invention. The system of the invention can be distributed between many software processes on several data communications devices, or all processes could run on a small set of dedicated computers, or on one computer alone.

It is to be understood that the embodiments of the invention can be embodied strictly as a software program, as software and hardware, or as hardware and/or circuitry alone, such as within a data communications device. The features of the invention, as explained herein, may be employed in data communications devices and/or software systems for such devices such as those manufactured by Empirix Inc. of Bedford, Mass.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Computers have been applied as test computers associated with contact centers. Various testing systems have been provided to test functions associated with the contact centers. For example, the Hammer IT™ from Empirix, Inc. of Bedford, Mass., can be used to simulate telephone callers in a public switched telephone network (PSTN) having one or more telephone callers who access the contact center either sequentially or in parallel. The Hammer IT™ system provides a "virtual telephone caller system" having "virtual telephone callers" that can exercise and test the responses of the one or more IVR systems. The virtual telephone caller system can also be used to test the agent telephony functions of the contact center, providing a "virtual agent telephone system" having "virtual agent telephones." The virtual telephone caller system can also be used to test FAX functions of the contact center.

Various testing systems have also been provided to test the agent computer function of the contact center. For example, the e-TEST™ system from Empirix Inc. can be used to simulate the computer functions of the agent computer, providing a "virtual agent computer system" having "virtual agent computers." The e-TEST™ system can also provide a "virtual web user system" having "virtual web users" that include simulations of people who access web pages on a web server within the contact center, and people who send/receive email associated with an email server within the contact center. The virtual telephone caller systems, virtual agent telephone systems, virtual agent computer systems, and virtual web user systems will hereafter be referred to as "virtual test systems."

Figure 1:
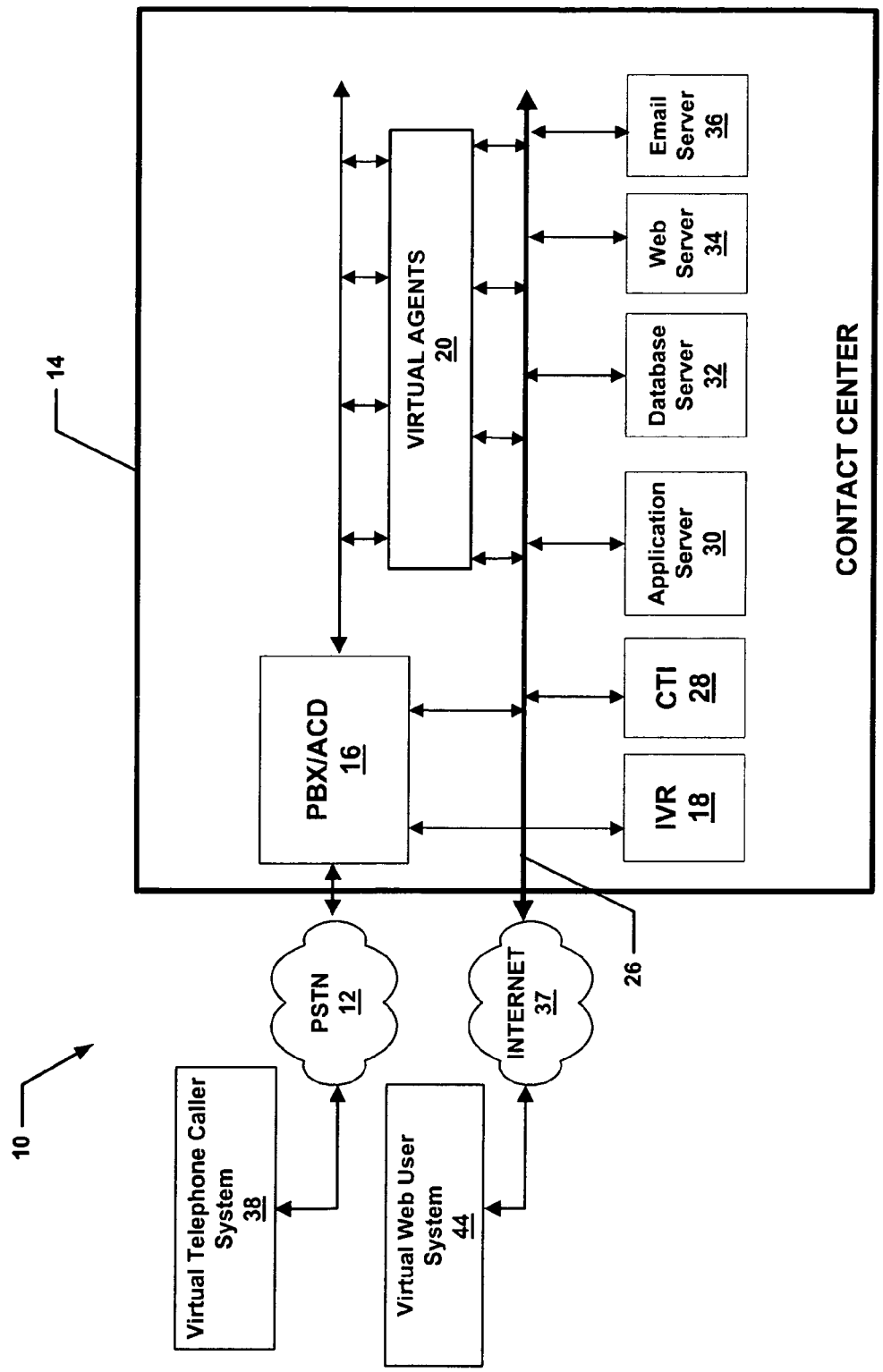
FIG. 1 comprises a block diagram of a contact center equipped to provide a method of testing using asynchronous automated virtual agent behavior in accordance with embodiments of the invention.

Referring now to FIG. 1, a particular embodiment of a test environment 10 is shown. The test environment 10 includes a contact center 14 connected to the public switched telephone network 12 (PSTN). The PSTN is the worldwide telephone system that provides telephone call connections, including telephone connections to a contact center 14. The contact center 14 can include a private branch exchange 16 (PBX) usually combined with an automatic call distributor 16 (ACD). The PBX 16 comprises a sub-system that can route incoming telephone calls to intended call recipients, or agents. The ACD 16 comprises a sub-system that can provide call queuing and automatic wait handling of incoming telephone calls. The PBX/ACD 16 can be coupled to one or more interactive voice response systems (IVRs) 18 that provide voice queries to a telephone caller. The voice queries typically direct the telephone caller through a series of selections that can be chosen by the telephone caller via button pushes on the telephone keypad or spoken responses.

Within the IVR queries, the telephone caller can be directed by the IVR 18 to select an option that connects the telephone caller, via the PBX/ACD 16, to one of a group of virtual agents 20.

The PBX/ACD 16 is further coupled to a network 26 that can be provided to couple together the PBX/ACD 16, a computer telephone integration (CTI) server 28, an application server 30, a database server 32, a web server 34, and an email server 36. The network 26 can correspond, for example, to an Ethernet local area network.

The IVR 18 can, among the IVR selections offered, request that the telephone caller enter identifying information, for example an account number, by button pushes on the telephone keypad or by voice responses from the telephone caller. Identifying information can also be automatically provided by the PBX/ACD 16 without entry by the telephone caller with a variety of methods, including dialed number identification service (DNIS) and automatic number identification (ANI). The identifying information is passed through the PBX/ACD 16 to the bus 26. The CTI 28 receives the identifying information and coordinates the identifying information with "caller data," for example account history associated with the telephone caller, contained in the database server 32. An application program in the application server 30 can automatically provide a display of the caller data in a screen pop to the virtual agent.

The contact center 14 can also be accessed via the Internet 37, for example by a web user who accesses a web page associated with the contact center. The web user, via the Internet 37, connects to the web server 34 for web page access. The web user can also be an email user, in which case the email user connects to the email server 36 via the Internet 37. While web page access and email access have been described herein, the invention is not limited to only these specific Internet applications. A variety of Internet applications can access a variety of servers within the contact center 14.

Virtual test systems have been applied to contact centers. For example, virtual telephone caller systems 38 have been provided to simulate telephone callers within the PSTN 12. The virtual telephone caller system 38 can generate "virtual telephone caller actions," for example virtual telephone calls, to the contact center 14, thereby accessing the PBX/ACD 16, the IVR 18, and a virtual agent 20. With this arrangement, different aspects of the contact center 14 can be tested for response accuracy and response time.

Similarly, virtual agent telephone systems 40 have been provided that can generate "virtual agent telephone actions" to simulate agents 20 within the contact center 14 who answer telephone calls. The virtual agent telephone systems 40 can also receive contact center functions, for example automatic voice data.

As mentioned above, the various elements of the contact center 14 can provide a screen pop to the virtual agents 20. Virtual agents 20 can generate "virtual agent computer actions" and receive contact center functions, for example screen pops and accesses to the data base server 32, to test the accuracy and the speed of such screen pops and the general speed and accuracy of accesses to the database server 32. It should be recognized that the screen pop is a complex operation coordinated by the PBX/ACD 16 that can receive the caller identifying information, the CTI 28 that can coordinate the identifying information with caller data, the application server 30 that accesses the caller data from the database server 32, and the agent computer 24 that displays the caller data. Thus, the screen pop on the agent computer 24 often occurs with a time latency compared to the time at which the telephone caller is connected to the agent telephone 22.

Virtual web user systems 44 have been provided that can generate "virtual web user actions" and receive contact center functions to test the Internet functions of the contact center 14. For example, the virtual web user system 44 can simulate one or more web users who access the contact center web pages that reside upon the web server 34. The web connection and web server 34 can thus be tested for web page accuracy and speed. Similarly, the virtual web user system 44 can simulate multiple emails from multiple web users. The web connection and the email server 36 can be tested for accuracy and speed.

In a particular embodiment, a virtual agent is provided that emulates multiple forms of interactions (e.g., telephony, fax VOIP, email chat, web) simultaneously. In this particular embodiment the virtual agent 20 is provided as a Java Agent. The Java Agent is able to simulate various actions that would be undertaken by an agent. A typical agent may utilize a CTI application, for example a toolbar, as part of the action of responding to an inquiry from a user via a telephone or web action. While the use of a particular CTI application is discussed, the invention is not limited to any particular CTI application. An example of a CTI application s is the Siebel contact center software, available from Siebel Systems of San Mateo, Calif. The software provides an interface including a toolbar allowing an agent to perform various actions such as log-in, answer a call, receive a screen pop, and log-out. As shown in FIG. 1, a virtual agent 20 may respond to a CTI request or a web-based request by simulating agent action. In an example of an agent emulating a human agent who would utilize a CTI application (e.g. the Siebel toolbar), the Java Agent implements the event protocol that the application uses to communicate with the CTI system, essentially replacing the application during a test execution.

The Java Agent can handle both telephony and web types of requests. The Java Agent is able to break a sequential list of steps into a web portion and a CTI portion and to simulate both portions in an asynchronous, coordinated manner. In such a manner, testing of the contact center from generating calls or web actions, to answering calls and responding thereto, as well as responding to web requests can be performed in a manner such that analysis of a variety of parameters of the call center can be quantified.

The above is but one example of a test of time latency that is of interest to a contact center designer. Other types of data that are of interest are described below.

A telephone caller places a telephone call to the contact center 14. The contact center 14 answers the call with an IVR system 18, which is done with a certain time latency. The IVR system 18 requests that the telephone caller enter identifying information, for example account and password via the telephone keypad. Alternatively, as mentioned above, the contact center can automatically identify the telephone caller. The contact center verifies that the telephone caller identity is valid by accessing the database server 32. The time latency between receiving the telephone caller identifying information and verifying that the caller identity is valid is also measured. The contact center 14 uses the CTI 28 to coordinate the identifying information with caller data within the database server 32. For example, the caller data can correspond to the last transaction completed by the telephone caller. The latency of the coordination of the identifying information with caller data is measured as well. The IVR system 18 suggests that the caller dial zero to connect to an agent 20, and the telephone caller presses zero. The telephone caller is connected to an agent telephone 22 with a latency that is also recorded. A screen pop including caller data appears at the agent computer 24 with a respective latency.

It will be recognized that if any of the measured latencies were to be excessive, the contact center would not provide optimal service to the telephone caller. Thus, it would be desirable for a contact center designer and a contact center manager to obtain latency time information associated with the various operations of the contact center.

The latency times of interest include, but are not limited to those indicated above. As indicated below, this invention can provide measurements of a variety of contact center latency times.

Time latencies between a variety of actions generated by one or a variety of virtual test systems, including the virtual telephone caller system 38, the virtual web user system 44, the virtual agent telephony system 40, and the virtual agent computer system 42, can be provided. Time latencies between the variety of actions generated by one or the variety of virtual test systems and a variety of contact center functions can also be provided. Time latencies between the varieties of contact center functions can also be provided.

Exemplary test data can include a time latency from an action requesting connection to an agent 20 to a screen pop upon an agent computer 24, a time latency for the IVR 18 to answer a telephone call generated by the virtual telephone caller system 38, an IVR 18 prompt response time, a time latency for CTI 28 data to arrive at the agent computer 24, a time latency for the agent computer 24 display screen to complete, a time latency for the agent computer 24 to receive events from the CTI, a time latency for the virtual telephone caller system 38 to connect to the agent telephone 22 once requested by the virtual telephone caller system 38, the database server 32 access time, a routing accuracy corresponding to a connection between the virtual telephone caller system 38 and the agent 20 upon a request from the virtual telephone caller system 38 for connection to the agent 20, and a display accuracy associated with the agent computer 24 screen pop data integrity. By way of a single virtual agent which simulates both web-based communications and telephony-based communications, more meaningful and accurate testing and measuring is performed.

Figure 2A:
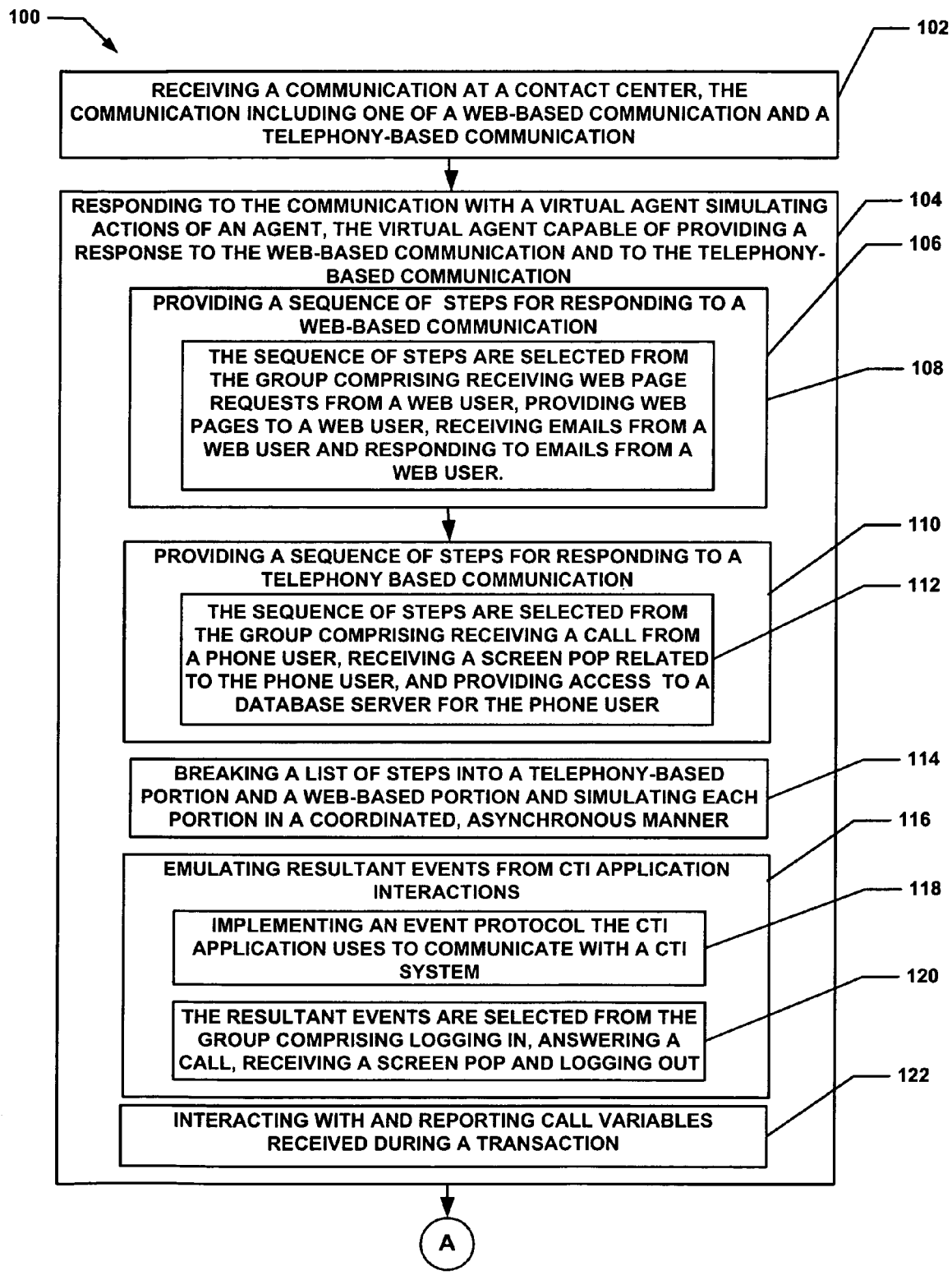
FIGS. 2A and 2B comprise flow diagrams of a particular embodiment of a method for providing a method of testing using asynchronous automated virtual agent behavior in accordance with embodiments of the invention.
Figure 2B:
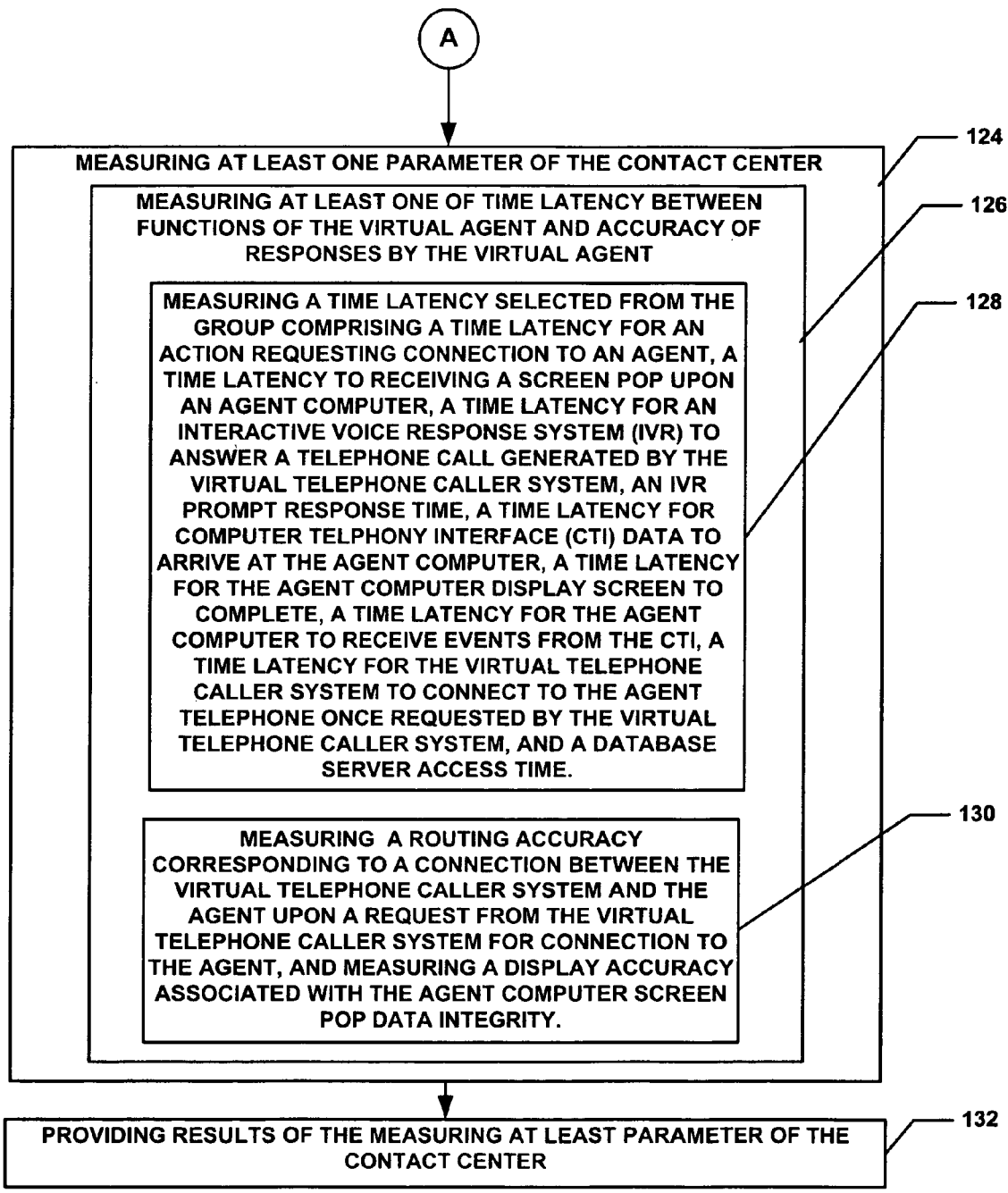

A flow chart of the presently disclosed method is depicted in FIGS. 2A and 2B. The rectangular elements are herein denoted "processing blocks" and represent computer software instructions or groups of instructions. Alternatively, the processing blocks represent steps performed by functionally equivalent circuits such as a digital signal processor circuit or an application specific integrated circuit (ASIC). The flow diagrams do not depict the syntax of any particular programming language. Rather, the flow diagrams illustrate the functional information one of ordinary skill in the art requires to fabricate circuits or to generate computer software to perform the processing required in accordance with the present invention. It should be noted that many routine program elements, such as initialization of loops and variables and the use of temporary variables are not shown. It will be appreciated by those of ordinary skill in the art that unless otherwise indicated herein, the particular sequence of steps described is illustrative only and can be varied without departing from the spirit of the invention. Thus, unless otherwise stated the steps described below are unordered meaning that, when possible, the steps can be performed in any convenient or desirable order.

Referring now to FIGS. 2A and 2B, a method 100 of testing using asynchronous automated virtual agent behavior begins with processing block 102 wherein a communication is received at a contact center. The communication can be in the form of a web-based communication and/or a telephony based communication. An example of a web-based communication would be a user access of a web page associated with the contact center, and an example of a telephony-based communication would be a call to an IVR wherein identifying information is entered. The communication can be generated by test software which simulates user actions.

In processing block 104 a virtual agent responds to the communication by simulating actions of an agent by performing a sequence of steps. A different sequence of steps is done when responding to a web-based communication than the sequence of steps for responding to a telephony based communication, as recited in processing blocks 106 and 110 respectively.

In processing block 108 the sequence of steps for responding to a web-based communication are selected from the group comprising receiving web page requests from a web user, providing web pages to a web user, receiving emails from a web user and responding to emails from a web user. In processing block 112 the sequence of steps for responding to a telephony based communication are selected from the group comprising receiving a call from a phone user, receiving a screen pop related to the phone user, and providing access to a database server for the phone user.

As recited in processing block 114, the responding can further include breaking a list of steps into a telephony-based portion and a web-based portion and simulating each portion in a coordinated asynchronous manner. Processing block 116 recites that the responding may further include emulating resultant events from CTI application interactions. This may be accomplished, as shown in processing block 118, by implementing an event protocol the CTI application uses to communicate with a CTI system. As shown in processing block 120 the agent actions are selected from the group comprising logging in, answering a call, receiving a screen pop and logging out. As shown in processing block 122, the responding may further include interacting with and reporting call variables during a transaction.

In processing block 124, at least one parameter of the contact center is measured. As shown in processing block 126, the measuring includes measuring at least one of time latency between functions of the virtual agent and accuracy of responses by the virtual agent.

In processing block 128, the measured time latencies include, but are not limited to, a time latency selected from the group comprising a time latency for an action requesting connection to an agent, a time latency to receiving a screen pop upon an agent computer, a time latency for an Interactive Voice Response system (IVR) to answer a telephone call generated by the virtual telephone caller system, an IVR prompt response time, a time latency for Computer Telephone Interface (CTI) data to arrive at the agent computer, a time latency for the agent computer display screen to complete, a time latency for the agent computer to receive events from the CTI, a time latency for the virtual telephone caller system to connect to the agent telephone once requested by the virtual telephone caller system, and a database server access time.

In processing block 130 the measuring of the accuracy of the response by the virtual agent includes measuring a routing accuracy corresponding to a connection between the virtual telephone caller system and the agent upon a request from the virtual telephone caller system for connection to the agent, and measuring a display accuracy associated with the agent computer screen pop data integrity.

In processing block 132, the results of the measuring of the at least parameter of the contact center are provided to a user. The user can utilize these results to determine potential problems or bottlenecks within the contact center, and take appropriate action to resolve such problems.

Figure 3:
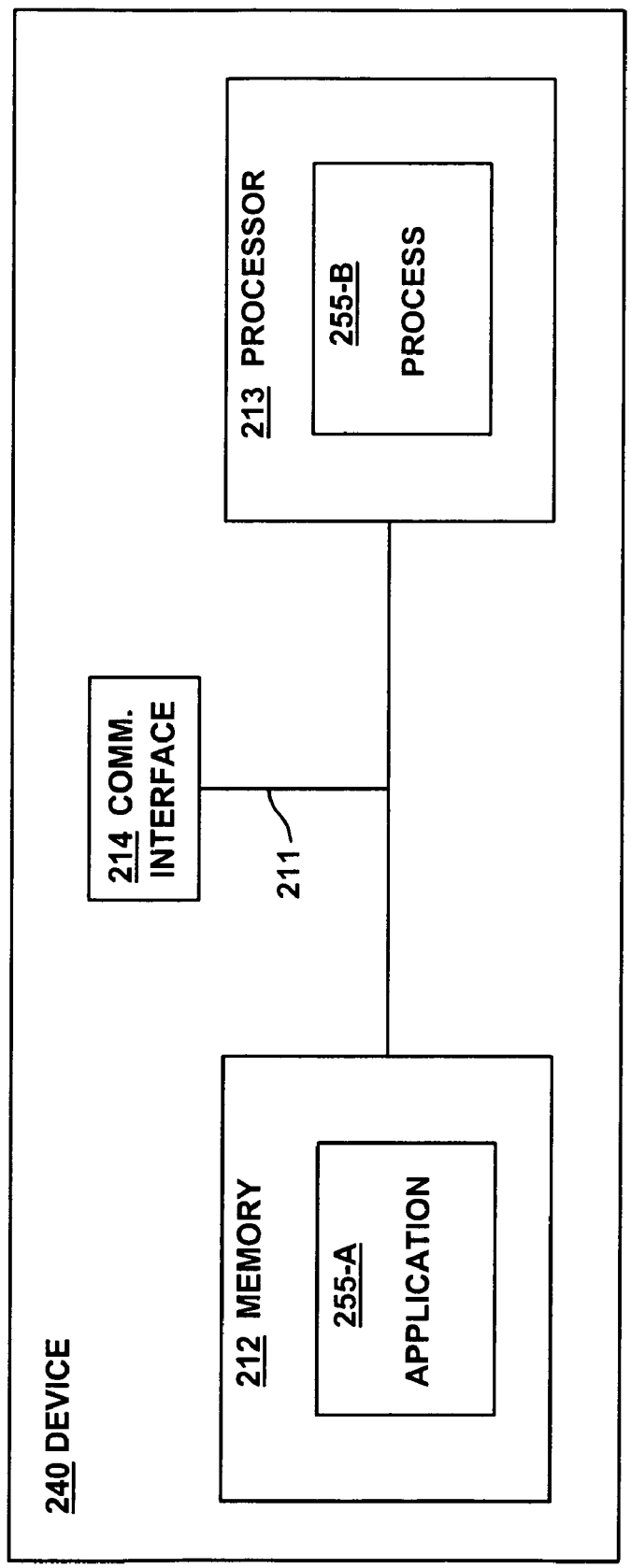
FIG. 3 illustrates an example computer system architecture for a computer system that performs a method of testing using asynchronous automated virtual agent behavior in accordance with embodiments of the invention.

FIG. 3 illustrates example architectures of a computer system that is configured as a contact center test system 240. The system 240 may be any type of computerized system such as a personal computer, workstation, portable computing device, mainframe, server or the like. In this example, the system includes an interconnection mechanism 211 that couples a memory system 212, a processor 213, and a communications interface 214. The communications interface 214 allows the computer system 240 to communicate with external devices or systems.

The memory system 212 may be any type of computer readable medium that is encoded with an application 255-A that represents software code such as data and/or logic instructions (e.g., stored in the memory or on another computer readable medium such as a disk) that embody the processing functionality of embodiments of the invention for the agent 255 as explained above. The processor 213 can access the memory system 212 via the interconnection mechanism 211 in order to launch, run, execute, interpret or otherwise perform the logic instructions of the applications 255-A for the host in order to produce a corresponding agent process 255-B. In other words, the agent process 255-B represents one or more portions of the agent application 255-A performing within or upon the processor 213 in the computer system. It is to be understood that the agent 255 operate as explained in former examples are represented in FIG. 5 by the agent application 255-A and/or the process 255-B.

It is to be understood that embodiments of the invention include the applications (i.e., the un-executed or non-performing logic instructions and/or data) encoded within a computer readable medium such as a floppy disk, hard disk or in an optical medium, or in a memory type system such as in firmware, read only memory (ROM), or, as in this example, as executable code within the memory system 212 (e.g., within random access memory or RAM). It is also to be understood that other embodiments of the invention can provide the applications operating within the processor 213 as the processes. While not shown in this example, those skilled in the art will understand that the computer system may include other processes and/or software and hardware components, such as an operating system, which have been left out of this illustration for ease of description of the invention.

Still other embodiments include a computerized device, configured to process all the method operations disclosed herein as embodiments of the invention. In such embodiments, the computerized device includes a memory system, a processor, communications interface in an interconnection mechanism connecting these components. The memory system is encoded with a process that provides a method of testing using asynchronous automated virtual agent behavior as explained herein that when performed (e.g. when executing) on the processor, operates as explained herein within the computerized device to perform all of the method embodiments and operations explained herein as embodiments of the invention. Thus any computerized device that performs or is programmed to perform up processing explained herein is an embodiment of the invention.

Other arrangements of embodiments of the invention that are disclosed herein include software programs to perform the method embodiment steps and operations summarized above and disclosed in detail below. More particularly, a computer program product is one embodiment that has a computer-readable medium including computer program logic encoded thereon that when performed in a computerized device provides associated operations providing a method of testing using asynchronous automated virtual agent behavior as explained herein. The computer program logic, when executed on at least one processor with a computing system, causes the processor to perform the operations (e.g., the methods) indicated herein as embodiments of the invention. Such arrangements of the invention are typically provided as software, code and/or other data structures arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC) or as downloadable software images in one or more modules, shared libraries, etc. The software or firmware or other such configurations can be installed onto a computerized device to cause one or more processors in the computerized device to perform the techniques explained herein as embodiments of the invention. Software processes that operate in a collection of computerized devices, such as in a group of data communications devices or other entities can also provide the system of the invention. The system of the invention can be distributed between many software processes on several data communications devices, or all processes could run on a small set of dedicated computers, or on one computer alone.

It is to be understood that the embodiments of the invention can be embodied strictly as a software program, as software and hardware, or as hardware and/or circuitry alone, such as within a data communications device. The features of the invention, as explained herein, may be employed in data communications devices and/or software systems for such devices such as those manufactured by Empirix Inc. of Bedford, Mass.

Having described preferred embodiments of the invention it will now become apparent to those of ordinary skill in the art that other embodiments incorporating these concepts may be used. Additionally, the software included as part of the invention may be embodied in a computer program product that includes a computer useable medium. For example, such a computer usable medium can include a readable memory device, such as a hard drive device, a CD-ROM, a DVD-ROM, or a computer diskette, having computer readable program code segments stored thereon. The computer readable medium can also include a communications link, either optical, wired, or wireless, having program code segments carried thereon as digital or analog signals. Accordingly, it is submitted that that the invention should not be limited to the described embodiments but rather should be limited only by the spirit and scope of the appended claims.

What is claimed is:

1. A method for testing a contact center, comprising the steps of:
   receiving a communication at said contact center, said communication including one of a web-based communication and a telephony-based communication, said web-based communication generated by a virtual web user system and said telephony-based communication generated by a virtual telephone caller system;
   responding to said communication with a virtual agent, said virtual agent simulating actions of an agent, said virtual agent providing a response to said web-based communication and to said telephony-based communication;
   measuring at least one parameter of said contact center without coordinating said web-based communication generated by said virtual web user system with said virtual agent and without coordinating said telephony-based communication generated by said virtual telephone caller system with said virtual agent; and
   providing results of said measuring of said at least one parameter of said contact center.

2. The method of claim 1 wherein said responding comprises performing a sequence of steps for responding to the web-based communication.

3. The method of claim 1 wherein said responding comprises performing a sequence of steps for responding to the telephony-based communication.

4. The method of claim 1 wherein said responding comprises breaking a list of steps into a telephony-based portion and a web-based portion and simulating an action of said agent to each of said telephony-based portion and said web-based portion in a coordinated, asynchronous manner.

5. The method of claim 1 wherein said responding to said communication includes emulating resultant events from CTI application interactions.

6. The method of claim 5 wherein said emulating resultant events from CTI application interactions comprises implementing an event protocol that a CTI application uses to communicate with a CTI system.

7. The method of claim 5 wherein said resultant events are selected from the group comprising logging in, answering a call, receiving a screen pop and logging out.

8. The method of claim 1 wherein said measuring at least one parameter comprises measuring at least one of a time latency between functions of said virtual agent and an accuracy of responses by said virtual agent.

9. The method of claim 8 wherein said measuring of said time latency between functions of said virtual agent is selected from the group comprising measuring said time latency for an action requesting connection to an agent, measuring said time latency to receiving a screen pop upon an agent computer, measuring said time latency for an Interactive Voice Response system (IVR) to answer a telephone call generated by the virtual telephone caller system, measuring said time latency of an IVR prompt response, measuring said time latency for Computer Telephone Interface (CTI) data to arrive at the agent computer, measuring said time latency for the agent computer display screen to complete, measuring said time latency for the agent computer to receive events from the CTI, measuring said time latency for the virtual telephone caller system to connect to the agent telephone once requested by the virtual telephone caller system, and measuring said time latency of a database server access.

10. The method of claim 8 wherein said measuring accuracy of response is selected from the group comprising measuring a routing accuracy corresponding to a connection between the virtual telephone caller system and the agent upon a request from the virtual telephone caller system for connection to the agent, and measuring a display accuracy associated with the agent computer screen pop data integrity.

11. The method of claim 2 wherein said sequence of steps for responding to said web-based communication are selected from the group receiving web page requests from said virtual web user system, providing web pages to said virtual web user system, receiving emails from said virtual web user system, and responding to emails from said virtual web user system.

12. The method of claim 3 wherein said sequence of steps for responding to said telephony-based communication are selected from the group comprising receiving a call from said virtual telephone caller system, receiving a screen pop related to said virtual telephone caller system, and providing access to a database server for said virtual telephone caller system.

13. A physical computer readable storage medium having computer readable code thereon for measuring at least one parameter of a contact center, the medium comprising:

instructions for receiving a communication at said contact center, said communication including one of a web-based communication and a telephony-based communication, said web-based communication generated by a virtual web user system and said telephony-based communication generated by a virtual telephone caller system;

instructions for responding to said communication with a virtual agent simulating actions of an agent, said virtual agent providing a response to said web-based communication and to said telephony-based communication;

instructions for measuring said at least one parameter of said contact center without coordinating said web-based communication generated by said virtual web user system with said virtual agent and without coordinating said telephony-based communication generated by said virtual telephone caller system with said virtual agent; and instructions for providing results of said measuring of said at least one parameter of said contact center.

14. The computer readable medium of claim 13 wherein said instructions for responding comprise instructions for performing a sequence of steps for responding to said web-based communication.

15. The computer readable medium of claim 13 wherein said instructions for responding comprise instructions for performing a sequence of steps for responding to said telephony-based communication.

16. The computer readable medium of claim 13 wherein said instructions for responding comprise instructions for breaking a list of steps into a telephony-based portion and a web-based portion and simulating an action of said agent to each of said telephony-based portion and said web-based portion in a coordinated, asynchronous manner.

17. The computer readable medium of claim 13 wherein said instructions for responding to said communication includes instructions for emulating resultant events from CTI application interactions.

18. The computer readable medium of claim 13 wherein said instructions for emulating resultant events from CTI application interactions comprises instructions for implementing an event protocol that a CTI application uses to communicate with a CTI system.

19. The computer readable medium of claim 17 wherein said resultant events are selected from the group comprising logging in, answering a call, receiving a screen pop and logging out.

20. The computer readable medium of claim 13 wherein said instructions for measuring said at least one parameter comprises instructions for measuring at least one of a time latency between functions of said virtual agent and an accuracy of responses by said virtual agent.

21. The computer readable medium of claim 20 wherein said time latency is selected from the group comprising a time latency for an action requesting connection to an agent, a time latency to receiving a screen pop upon an agent computer, a time latency for an Interactive Voice Response system (IVR) to answer a telephone call generated by the virtual telephone caller system, a time latency of an IVR prompt response time, a time latency for Computer Telephone Interface (CTI) data to arrive at the agent computer, a time latency for the agent computer display screen to complete, a time latency for the agent computer to receive events from the CTI, a time latency for the virtual telephone caller system to connect to the agent telephone once requested by the virtual telephone caller system, and a time latency of a database server access.

22. The computer readable medium of claim 20 wherein said accuracy of response is selected from the group comprising a routing accuracy corresponding to a connection between the virtual telephone caller system and the agent upon a request from the virtual telephone caller system for connection to the agent, and a display accuracy associated with the agent computer screen pop data integrity.

23. The computer readable medium of claim 14 wherein said sequence of steps for responding to said web-based communication are selected from the group comprising receiving web page requests from said virtual web user system, providing web pages to said virtual web user system, receiving emails from said virtual web user system, and responding to emails from said virtual web user system.

24. The computer readable medium of claim 15 wherein said sequence of steps for responding to said telephony-based communication are selected from the group comprising receiving a call from said virtual telephone caller system, receiving a screen pop related to said virtual telephone caller system, and providing access to a database server for said virtual telephone caller system.

\* \* \* \* \*